Oct. 20, 1953     I. Z. SMOKER     2,656,030
PICKUP BALE LOADER
Filed Sept. 13, 1948     4 Sheets-Sheet 2
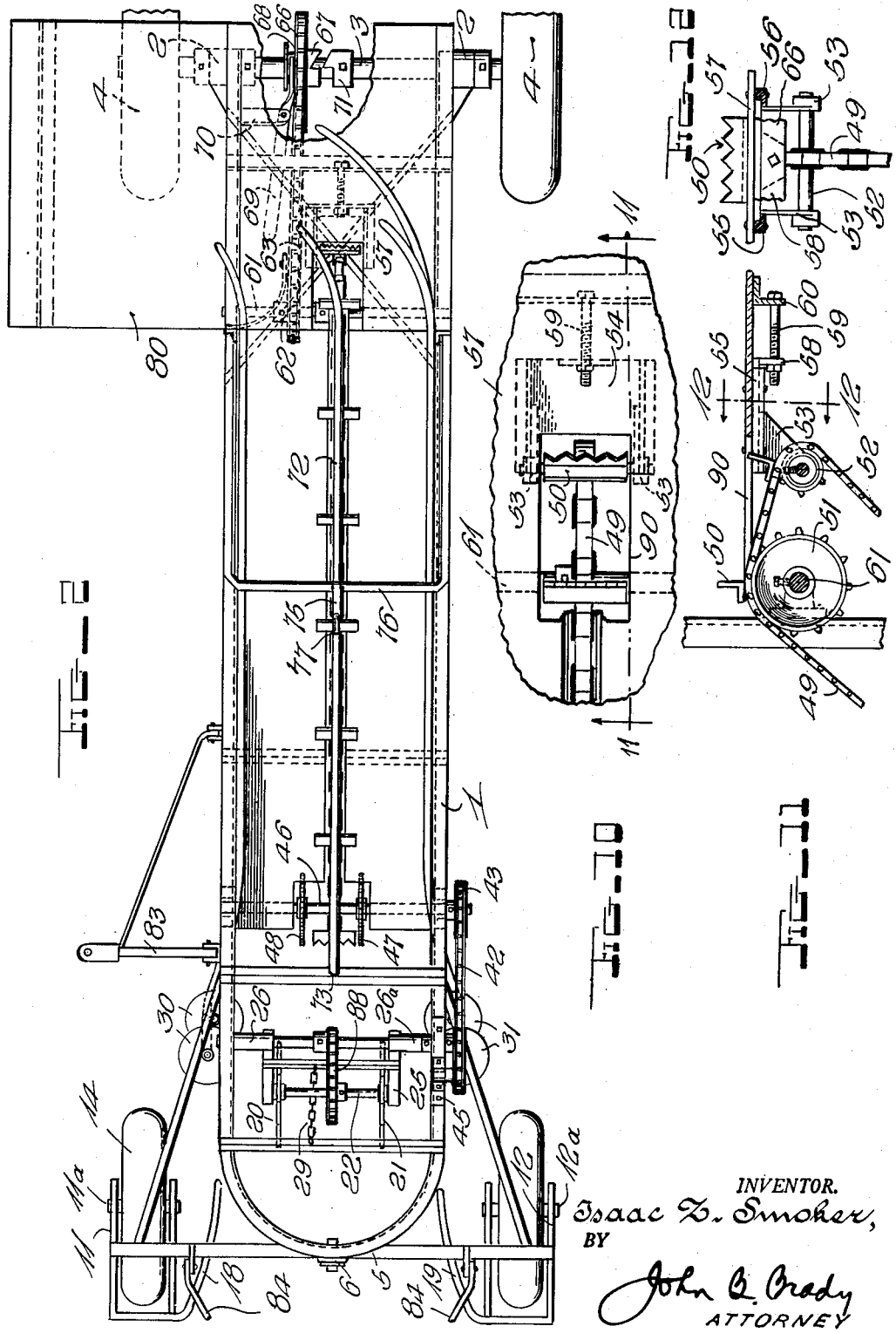
INVENTOR.
Isaac Z. Smoker,
BY
John C. Brady
ATTORNEY Oct. 20, 1953     I. Z. SMOKER     2,656,030
PICKUP BALE LOADER
Filed Sept. 13, 1948     4 Sheets-Sheet 3
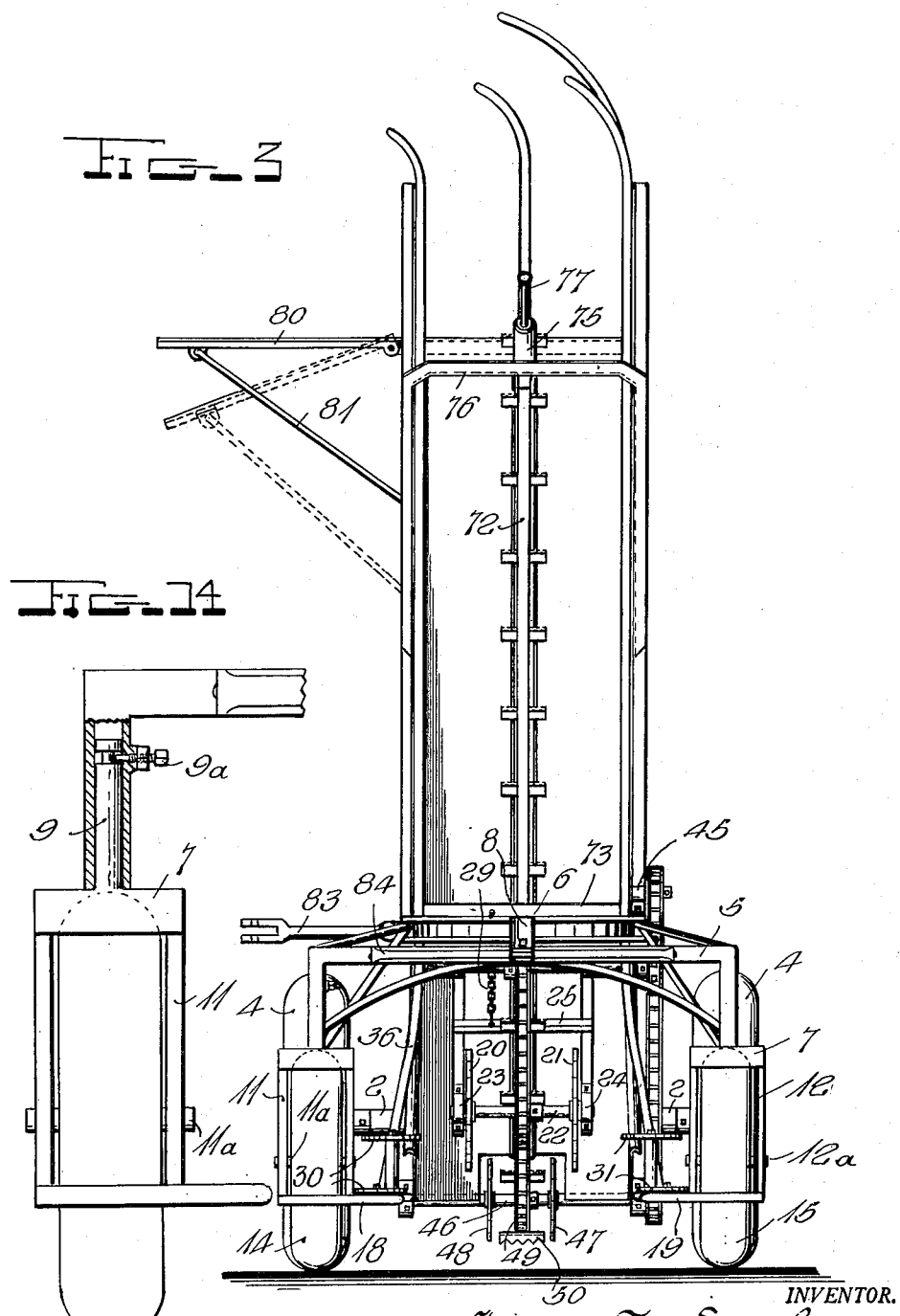
INVENTOR.
Isaac Z. Smoker,
BY John B. Brady
ATTORNEY

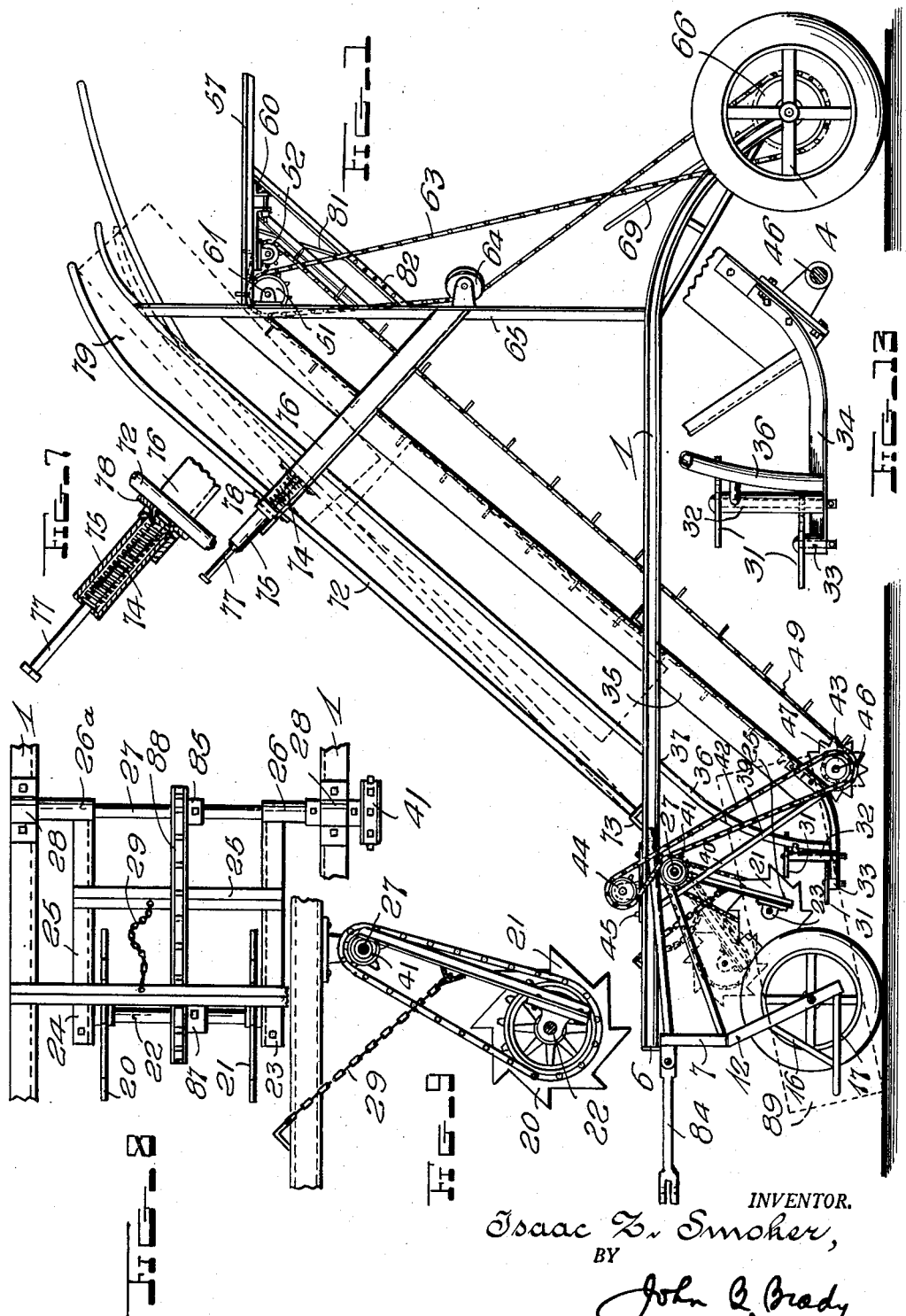

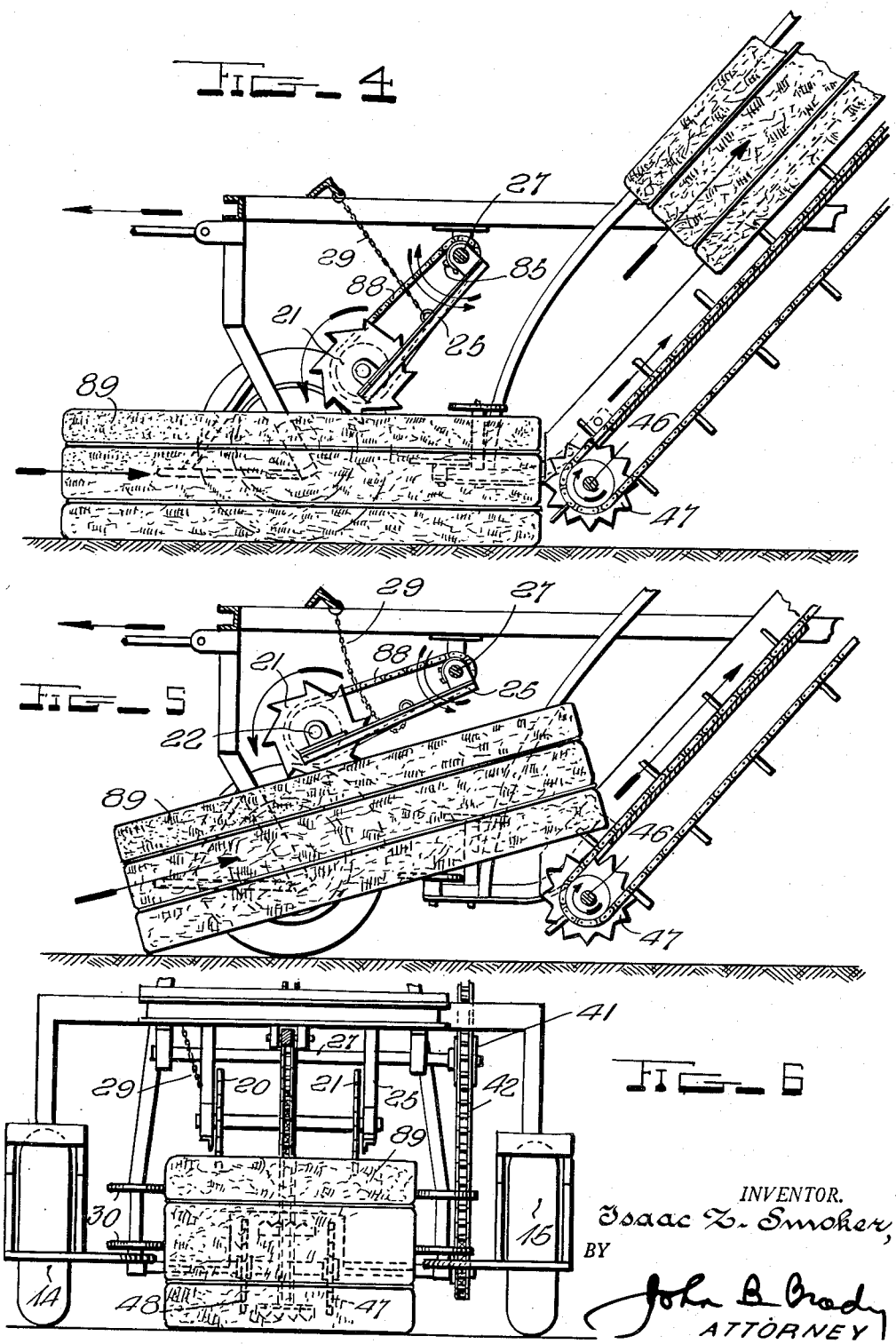

Patented Oct. 20, 1953

2,656,030

UNITED STATES PATENT OFFICE 2,656,030

PICKUP BALE LOADER

Isaac Z. Smoker, Intercourse, Pa.

Application September 13, 1948, Serial No. 49,071

7 Claims. (Cl. 198—9)

My invention relates broadly to bale loaders, and more particularly to an improved construction of bale pickup, elevating, and discharge mechanism for bale loaders.

One of the objects of my invention is to provide an improved pickup mechanism for bale loaders for facilitating the elevating of bales from the field into a stacked arrangement in a car or truck.

Another object of my invention is to provide an improved bale gripping means for bale loaders for directing the bales to a bale elevating conveyor for discharge in stacked position into a car or truck.

Other and further objects of my invention reside in the improved details of construction for a bale loader as set forth more fully in the specification hereinafter following by reference to the accompanying drawings, in which:

Figure 1 is a side elevational view of the improved bale loader of my invention;

Fig. 2 is a plan view of my improved bale loader;

Fig. 3 is a front elevational view of my improved bale loader;

Fig. 4 is a fragmentary elevational view showing the mechanism of my invention for picking up bales from the field and directing the bales to the elevating conveyor, the view illustrating the initial position of the bale loading mechanism as the bale is picked up in the field;

Fig. 5 is a view similar to the view shown in Fig. 4 but illustrating the next progressive step in the feeding of the bale to the elevating conveyor;

Fig. 6 is an end view of the bale pickup mechanism as illustrated in Fig. 4 and showing a bale being centered in position with respect thereto preparatory to a feeding operation into the elevating conveyor;

Fig. 7 is a detailed view showing the spring tensioning mechanism for directing the bales along the elevating conveyor to the discharge position at the top of the loader;

Fig. 8 is an enlarged fragmentary plan view of the spike-point wheels which gravitationally engage the top of the bale as the bale is fed to the elevating conveyor;

Fig. 9 is an enlarged fragmentary side elevational view of one of the spike-point wheels employed for engaging the top of the bale for directing the bale into the elevating conveyor;

Fig. 10 is a fragmentary plan view illustrating the detail of the mechanism for tensioning the elevator conveyor;

Fig. 11 is a fragmentary vertical sectional view taken substantially on line 11—11 of Fig. 10;

Fig. 12 is a fragmentary end view of the tensioning mechanism for the upper end of the elevating conveyor, the view being taken looking substantially in the direction of line 12—12 of Fig. 11;

Fig. 13 is a fragmentary enlarged side elevational view showing one of the bale guide means used for directing a bale into the elevating conveyor, certain of the parts being shown in vertical section; and Fig. 14 is an enlarged view showing one of the wheel supports for the loader.

Referring to the drawings in detail, the chassis 1 is provided with journals 2 for rear axle 3 on which rear wheels 4 are mounted. The front of the chassis is provided with a front frame bar 5 having a center support 6 for pivotally mounting front wheel support 7 as shown in Fig. 1. The center support 6 has a pivotal connection 8, as shown in Fig. 3, with the front wheel support 7. The ends of the front wheel supports 7 are provided with vertical pivot members 9 which carry right and left hand caster-yokes 11 and 12, shown in Figs. 3 and 14, each supporting journals 11a and 12a for front wheels 14 and 15. Caster yokes 11 and 12 provide supporting means 16 and 17 for bale guiding extensions 18 and 19. Caster units are held in place by means of screw 9a extending into a groove in part 9, as shown in Fig. 14.

Directly behind the bale centering, directing and guiding mechanism is the pickup mechanism which is supported by the frame members extending from the chassis and from the conveyor channel sides. As the bales are directed into the channelway by the guide extensions 18 and 19 they are engaged by the spike-point wheels 20 and 21 which are secured to shaft 22 which is pivoted in bearings 23 and 24, as shown in Fig. 8 and in the progressive series of views Figs. 4, 5, and 6 and which are carried by yoke or frame 25 having pivotal bearings 26 and 26a in which rotate shaft 27 which is supported by bearings 28 which are bolted to the underside of chassis frame 1.

Frame 25 swings freely on shaft 27 but is limited in the downward direction by chain 29. As the spike-point wheels 20 and 21 engage the bale it immediately rolls upward and over the top of the bale and exerts a firm pulling tendency on the bale toward the elevator.

Another means of centering and guiding the bales to the pickup mechanism is provided by right and left side disks 30 and 31 which are mounted horizontally on tubular pivot bearings 32 and 33 which are supported by angle-iron brackets, right and left, 34 which are bolted to conveyor channel sides 35. Brackets 34 are also braced by tubular member 36 which is welded to chassis at the intersection 37 and also at the intersection point 39 to brace 40.

Shaft 27 is driven by sprocket 41 by means of chain 42 which is operated by sprocket 43. This chain 42 operates over sprocket 43 which rotates clock-wise and then passes over sprocket 41 and causes it to rotate counter-clockwise. This arrangement of drive makes necessary the idle sprocket 44 which is mounted in chain adjustable bearing 45 attached to chassis 1. Sprocket 43 on shaft 46 operates booster star-wheels 47 and 48 which are secured to the shaft 46 and are especially valuable for lifting the bale to the conveyor as they exert a constant lift.

Shaft 49 is driven by conveyor chain 49 passing over sprocket 51 which is provided with saw-tooth cleats 50 for gripping the bale sufficiently to carry the bale up the incline. I wish to specially emphasize the construction of the enlarged detail shown in Fig. 10 where saw-tooth cleat 50 starts to disengage the bite in the bale after it has tilted off the incline upon the platform. At this point the chain 49 is directed downward to a smaller sprocket 52, thus drawing the saw-tooth cleat out of the bale without mutilating it.

Sprocket 52 is mounted on bracket 53 which is attached to slide-plate 54 and is directed by two T-slot bars 55 and 56 which are bolted to platform 57. Slide-plate 54 has a downward projection 58 with a drilled hole for bolt 59 to pass through. Fixed angle iron 60 is also drilled for bolt 59 thus making slide-plate 54 adjustable for chain take-up. Shaft 61 is driven by sprocket 62 on which operates main drive chain 63. This being a crossed chain necessitates an idler pulley 64 which is attached to frame member 65. Main drive-sprocket 66 is provided with a clutch hub 67 on one side and a shifter groove 68 on the other side. Shift lever 69 is fulcrumed on bracket 70 and engages groove 68 with yoke shaped end. By operating lever 69 sprocket 66 may be shifted on shaft 3 thus engaging or disengaging clutch hub 67 with clutch collar 71 which is securely fixed to shaft 3.

Bar 72 is attached to cross-bar 73 which is fixed to chassis frame 1. Bar 72 by means of compression spring 74 exerts a continuous pressure on the bale, thus holding it in engagement with the cleats 50. Spring 74 is encased in member 75, as shown more clearly in Fig. 7, which is securely attached to U-shaped frame 76 which is welded to frame member 65. Rod 77 extends through spring 74 and is secured to clip 78 which is welded to rod 72. An enlarged sectional view of this spring unit is shown in Fig. 7 with the spring fully compressed by bar 72 being raised up and riding on bale 79. Chute 80 is adjustable by means of hinges and supporting rod 81 which may be placed at various positions by setting rod in different holes in brace member 82. Side hitch 83 is hinged to chassis 1 for lowering during transportation at which time the front hitch 84 is used as shown in Fig. 1.

The drive for the bale loader is effected from the rear wheels 4 which drives shaft 3 and sprocket 66 under control of clutch hub 67 and clutch collar 71 controlled by shift lever 69. Sprocket chain 63 drives shaft 61 which drives the conveyor 49. Conveyor 49 imparts driving movement to shaft 46 which operates sprocket 43 and booster star wheels 47 and 48. Sprocket 43 drives chain 42 which operates over the idle sprocket 44 and engages sprocket 41 on shaft 27. The yoke or frame 25 which is angularly shiftable around shaft 27 as a center carries shaft 22 on which the spike wheels 20 and 21 are mounted. Sprocket 85 on shaft 27 rotatively drives sprocket 87 on shaft 22 through sprocket chain 88. Thus, spike wheels 20 and 21 are driven in a counter-clockwise direction while star wheels 47 and 48 are driven in a clockwise direction. The sets of spike wheels and star wheels cooperate in moving the bale designated at 89 from the pickup position in which the bale is encountered in the field as represented in Figs. 4 and 6 to the raised position represented in Fig. 5 preparatory to being engaged by the elevating conveyor as represented in Fig. 5.

The side disks 30 and 31 operate to center the bale in a position in which the top of the bale is engaged by spike wheels 20 and 21 while the end and bottom of the bale is engaged by star wheels 47 and 48 in raising the bale to a position in which it may be moved on to the elevating conveyor.

It will be observed that the star wheels 47 and 48 are symmetrically arranged in vertical planes extending on opposite sides of the elevating conveyor and that similarly the spike wheels 20 and 21 are symmetrically arranged in vertical planes extending on opposite sides of the elevating conveyor but offset from the planes of the star wheels 47 and 48. This opposite arrangement ensures stabilized gripping of the bale 89 and the movement thereof on to the elevating conveyor, as clearly shown in Figs. 4 and 5. The rotation of the spike wheels 20 and 21 is in that direction which ensures the pulling of the bale toward the elevating conveyor.

The slack which may occur from time to time in the chain 49 is taken up by the adjustment of slide-plate 54 which shifts the bracket 53 carrying sprocket 52 to a position in which sprocket chain 49 is properly stretched. The slot 90 in platform 57 is of such length that the saw-tooth cleats 50 may pass downwardly and clear platform 57 as the cleats are gradually and progressively withdrawn from the bale 89 without mutilating the bale.

I have found the structure of my invention highly practical in manufacture, production and use, and while I have described my invention in certain preferred embodiments, I realize that modifications may be made in details of construction and I desire that it be understood that no limitations upon my invention are intended other than may be imposed by the scope of the appended claims.

What I claim as new and desire to secure by Letters Patent of the United States is as follows:

1. In a bale loader, bale gripping means comprising a frame structure, transversely arranged shaft members journalled in said frame structure at levels spaced one above the other, spike wheels disposed in spaced positions on one of said shaft members, coacting star wheels disposed in spaced positions on another of said shaft members, the said spike wheels operatively engaging the top of a bale and the coacting star wheels operatively engaging the ends and bottom of the bale for progressively moving said bale to a conveyor mechanism, rotary discs supported on said frame structure for engaging the sides of the bale, and means for simultaneously driving said spike wheels and said star wheels.

2. In a bale loader, a frame structure, a pendently hung transverse shaft supported by said frame structure, spaced spike wheels carried by said shaft and operative to engage the top of a bale, and a coacting transverse shaft journalled with respect to said frame structure and having spaced star wheels thereon operative to engage the end and bottom of a bale in coaction with said spike wheels for moving said bale to an elevating conveyor, rotary discs for engaging the sides of the bale, and means for simultaneously driving said spike wheels and said star wheels.

3. A bale loader comprising a frame structure, a pair of transversely disposed shafts journalled in laterally displaced positions with respect to said frame structure, one of said transverse shafts being disposed on a level substantially above the level of the other of said transverse shafts, a pair of bale engaging spaced spike wheels carried by one of said shafts and a pair of spaced star wheels carried by the other of said shafts said spike wheels being operative to engage top of a bale and said star wheels being operative to engage the end and bottom of the bale for moving the bale to a bale conveying mechanism, the star wheels on one of said shafts being spaced within the transverse limits of the spike wheels on the other of said shafts, and rotating discs mounted on said frame structure for engaging and guiding the sides of the bale.

4. A bale loader comprising a frame structure, a pair of shaft members journalled with respect to said frame structure in planes offset one from the other transversely of said frame structure, and disposed at different levels, the shaft member at the higher level being disposed in advance of the shaft member at the lower level with respect to the direction of movement of said frame structure, a swingable yoke journalled on the shaft member that is disposed at the higher level, a shaft journalled in the end of said yoke, spaced spike wheels carried by said last mentioned shaft, means for rotatively driving said last mentioned shaft and the spike wheels carried thereby, said last mentioned shaft and the spike wheels carried thereon being swingable in a curved path as said yoke shifts angularly with respect to said last mentioned shaft member for engaging the top of the bale, rotary discs mounted on said frame structure for engaging the sides of the bale, and coacting spaced star wheels carried by the shaft member that is disposed at the lower level for engaging the end and the bottom of the bale for moving the bale into a conveying mechanism.

5. In a bale loading mechanism, a frame structure, a pair of shaft members journalled transversely of said frame structure, one of said shaft members being displaced forwardly with respect to the other of said shaft members and disposed on a level above said second mentioned shaft member, a swingable yoke journalled on said first mentioned shaft member and associated therewith, a shaft journalled in the end of said swingable yoke, means for driving the shaft in said swingable yoke from the associated shaft member, spaced spike wheels carried by said shaft and operative to engage the top of a bale, rotary discs mounted on said frame structure for engaging the sides of the bale, spaced star wheels carried by said second mentioned shaft member and operative to engage the end and bottom of the bale, said spaced star wheels and said spaced spike wheels coacting to move the bale into an elevating mechanism, said yoke being displaceable angularly about said first mentioned shaft member through the frame structure as the bale is advanced into the elevating mechanism, and means for restricting the angular movement of said yoke with respect to the bale.

6. In a bale loading mechanism, a frame structure, shaft members journalled transversely on said frame structure, said shaft members being disposed at different elevations and offset longitudinally of said frame structure, a yoke pivotally mounted with respect to the shaft member disposed at the higher elevation and swingable thereabout, a transverse shaft journalled adjacent the lower end of said yoke, means for driving said transverse shaft from the said first mentioned shaft member, spaced spike wheels carried by said transverse shaft and engageable with the top of a bale for moving the bale rearwardly toward the shaft member that is disposed at the lower elevation, spaced star wheels carried by said last mentioned shaft member and engageable with the end and bottom of the bale for raising said bale into an elevating mechanism, rotary discs mounted on said frame structure for engaging the sides of the bale, said spaced spike wheels being displaceable upwardly as the bale is raised by said spaced star wheels, means for restricting the extent of the downward movement of said spaced spike wheels, and means for simultaneously driving said spaced spike wheels and said spaced star wheels in opposite directions.

7. In a bale loading mechanism, a frame structure, shaft members journalled on said frame structure, said shaft members being disposed at different elevations and offset longitudinally of said frame structure, a yoke pivotally mounted with respect to the shaft member disposed at the higher elevation and swingable thereabout, a transverse shaft journalled adjacent the lower end of said yoke, means for driving said transverse shaft from the said first mentioned shaft member, spaced spike wheels carried by said transverse shaft and engageable with the top of a bale for moving the bale rearwardly toward said shaft member disposed at the lower elevation, spaced star wheels carried by said last mentioned shaft member and engageable with the end and bottom of the bale for raising said bale into an elevating mechanism, rotary discs mounted on said frame structure for engaging the sides of the bale, said spaced spike wheels being displaceable upwardly as the bale is raised by said spaced star wheels, means for restricting the extent of the downward movement of said spaced spike wheels, and chain and sprocket mechanism associated with each of said shaft members for driving said spaced spike wheels and said spaced star wheels in directions toward each other for engaging and advancing the bale therebetween.

ISAAC Z. SMOKER.

References Cited in the file of this patent

UNITED STATES PATENTS

| Number | Name | Date |
|---|---|---|
| 1,305,880 | Case | June 3, 1919 |
| 1,536,444 | Martin | May 5, 1925 |
| 1,570,256 | Hunt | Jan. 19, 1926 |
| 2,302,656 | Dray | Nov. 17, 1942 |
| 2,335,924 | Elholm | Dec. 7, 1943 |
| 2,406,976 | Walz et al. | Sept. 3, 1946 |
| 2,410,238 | Ringrose | Oct. 29, 1946 |
| 2,477,795 | Gehl | Aug. 2, 1949 |
| 2,525,870 | Crofoot | Oct. 17, 1950 |